UNITED STATES PATENT OFFICE.

JOHN RUDOLPHS AND JOHN LANDIN, OF STOCKHOLM, SWEDEN, ASSIGNORS TO ALWIN JACOBI, OF STOCKHOLM, SWEDEN.

METHOD OF EXTRACTING METALS FROM THEIR OXID ORES.

SPECIFICATION forming part of Letters Patent No. 698,739, dated April 29, 1902.

Application filed December 11, 1897. Serial No. 661,544. (Specimens.)

*To all whom it may concern:*

Be it known that we, JOHN RUDOLPHS and JOHN LANDIN, subjects of the King of Sweden and Norway, and residents of Stockholm, Sweden, have invented certain new and useful Improvements in Methods of Extracting Metals from Their Oxid Ores, of which the following is a specification.

This invention relates to a method of extracting metals from their oxid ores or other oxygen compounds by dry reduction in heat.

The method consists in first mixing the metalliferous raw materials in a pulverized or finely-divided state with pulverized or finely-divided carbon and such solid or liquid organic nitrogenous and hydrocarbon containing materials in a finely-divided state as on subsequent moderate heating to about 300° or 500° centigrade will cause the mixture to change its aggregate state, forming a uniformly-caked mass. As examples of the latter substances may be mentioned blood-charcoal or other kinds of carbon which are rich in nitrogen or products of distillation obtained from such carbons, ferrous or ferric cyanic compounds, (mixed with materials containing hydrocarbon,) dried and ground blood, leather, or horn, &c. The mixture thus obtained is subsequently heated in the shape either of lumps or of pieces of definite shape—as briquets, for instance—preferably on being previously compressed and while under pressure, so as to cause it to change its aggregate state, assuming the form of a uniformly-caked mass, the oxygen compounds of the metal being thus surrounded by a dense vitreous envelop. This mass, with or without previous and more intense heating, is used as charge in the furnace where the extraction of the metal is to take place. Where the character of the metalliferous raw material so demands in order that a fusible slag may be formed from the impurities contained, there is added to the mixture previous to its preparatory heating for effecting its aggregate change some suitable flux—lime, for instance—for ores rich in silicic acid, &c. With ores containing impurities having deleterious effects on the properties of the metal such substances are also added as will combine with the said impurities, and thus remove them from the metal—for instance, with phosphorous ores, carbonate of soda, &c. The products of distillation escaping during the heating operation are condensed and collected to be again utilized as a flux for fresh mixtures of the metalliferous raw material with carbon.

Having thus generally outlined the invention, we will now proceed to describe the methods followed in obtaining specific metals, a beginning being made with iron, which can in this manner be produced in a malleable state or with a higher or lower percentage of carbon, at will. Particularly suited for use in the extraction of iron by this method is so-called "separated ore," which already during the separating process must be in a finely-divided state, and also bog ore. As an example, ore of the former kind may be taken. For the sake of simplicity it may also be assumed that the ore belongs to those ores whose constituents of rock are capable of forming a liquid slag without the addition of either basic or sour substances. The reverse being the case, the necessary fluxes would have to be added as required, according to the results of an analysis made in accordance with well-known principles in each individual case, the materials thus added likewise to be in a finely-divided, solid, or liquid—*i. e.* molten—state. To an ore of the description previously mentioned containing, for instance, sixty-five per cent. of iron corresponding to 89.7 per cent. of magnetic oxid of iron there may for the production of iron containing about two per cent. of carbon advantageously be added for each thousand kilograms of ore one hundred and eighty kilograms finely-divided anthracite, thirty kilograms coal-tar, and fifteen kilograms dry blood—*i. e.*, dried and ground blood. In place of anthracite, coals richer in nitrogen may be used, a smaller quantity of dry blood being then required. On being mixed the materials are suitably formed into briquets in a press, and in the compressed state they are heated to 400° centigrade, at which temperature the mixture changes its aggregate state, a uniformly-caked mass being obtained. This caked mass, preferably while hot, is subsequently charged into a smelting-furnace, where the reduction of iron takes place. If it is desired to produce iron with less than two per cent. of carbon, the addition of coal mentioned is reduced in quantity, and when iron of a higher percentage of carbon is desired the said addition is increased. The added materials containing nitrogen and hydrocarbons form during the heating operation products of distillation, which latter are condensed and again utilized in place of tar as additions for fresh quantities of iron ore, the proportion of dry blood being then reduced according to the percentage of nitrogen in the products of distillation obtained.

Another metal in the extraction of which the new process may be advantageously employed is aluminium. According to the methods hitherto made use of for extracting this metal in an electric furnace a pulverized mixture of the raw materials has been introduced between the electrodes in the furnace. The aluminous raw materials used have been alumina, (usually bauxite,) generally in conjunction with fluorids, (cryolite, &c.,) as a flux. Electrolysis of fluorid of alkali is then assumed to take place in such a manner that alkaline metal is separated and acts to separate metallic aluminium from fluorid of aluminium, while the fluorid reacts on alumina, reforming fluorid of aluminium, &c., alumina besides being reduced by the carbon anode. According to the improved method here referred to the aluminous raw material is mixed with finely-divided carbon and an organic material containing nitrogen and hydrocarbons—for instance, blood-charcoal and coal-tar rich in nitrogen. With bauxite the mixture is so proportioned as to make its percentage of carbon corresponding to the oxygen contained in the aluminous raw material. It has been found that a suitable mixture is formed by adding twenty-five kilograms finely-divided anthracite, ten kilograms coal-tar, and five kilograms dry blood to each one hundred kilograms finely-divided alumina. On thoroughly mixing the ingredients mentioned the mixture is pressed into briquets or strings and subsequently heated, the products of distillation being collected, as before described with regard to iron, and the caked mass obtained being introduced between the electrodes in an electric furnace, where metallic aluminium is extracted.

In extracting zinc from zincspar (carbonate of zinc) or roasted zinc blende an analogous method is followed. The pulverized ore is mixed, for instance, with finely-divided anthracite, tar, and dry blood in the proportions given for aluminium, while the total percentage of carbon is adjusted so as to be sufficient for the extraction of the zinc. The mixture is subsequently pressed and heated, as before stated for iron and aluminium, and the caked briquets or strings are heated between carbon electrodes in the electric furnace or in other manner for the extraction of the zinc. A similar procedure is adopted also in extracting tin from tin ore, copper from oxids or roasted copper ores, wolfram from tungstate of lime, &c.

Having now particularly described and ascertained the nature of our said invention and in what manner the same is to be performed, we declare that what we claim is—

A process for producing briquets or other bodies which are hard, do not fall into pieces at a high temperature and are suitable for reduction, consisting in mixing pulverized oxid ores, carbon, hydrocarbon and an organic nitrogen compound or compounds, pressing the mixture to bodies of suitable shape and finally heating said bodies to 300° to 500° centigrade.

In witness whereof we have hereunto set our hands in presence of two witnesses.

JOHN RUDOLPHS.
JOHN LANDIN.

Witnesses:
 B. LINDH,
 H. TELANDER.